United States Patent [19]

Brickner et al.

[11] Patent Number: 4,973,219
[45] Date of Patent: Nov. 27, 1990

[54] GRID RAIL CONTAINER TRANSPORT AND STORAGE SYSTEM

[75] Inventors: Laurence R. Brickner, Marathon, N.Y.; Michael D. Chun, Budd Lake, N.J.; Richard C. Chou, Montrey Park, Calif.; Carl von Isenburg, Winston Salem, N.C.; Phillip Radzikowski, Bethesda, Md.

[73] Assignee: Sea-Land Corporation, Elizabeth, N.J.

[21] Appl. No.: 220,975

[22] Filed: Jul. 15, 1988

Related U.S. Application Data

[63] Continuation of Ser. No. 857,833, Apr. 30, 1986, abandoned.

[51] Int. Cl.$^5$ .......................... B61B 3/02; B65G 63/00
[52] U.S. Cl. ...................................... 414/792.9; 104/88; 104/130; 105/154; 414/140.3; 414/141.3; 414/626
[58] Field of Search .................. 104/95, 88, 130, 290; 105/148, 154, 156; 414/140.3, 141.3, 626, 792.8, 792.9, 139.9

[56] References Cited

U.S. PATENT DOCUMENTS

| | | | |
|---|---|---|---|
| 1,207,226 | 12/1916 | Schilling | 414/139 X |
| 2,657,643 | 11/1953 | Swanback et al. | |
| 2,714,355 | 8/1955 | Benson . | |
| 2,887,067 | 5/1959 | Cotesworth . | |
| 3,091,188 | 5/1963 | Graham | 414/139 X |
| 3,204,575 | 9/1965 | O'Donnell . | |
| 3,490,622 | 1/1970 | Brackin | 414/626 X |
| 3,543,952 | 12/1970 | Young | 414/139 |
| 3,559,822 | 2/1971 | Lichtenford et al. | 414/139 |
| 3,591,023 | 7/1971 | Allen . | |
| 3,628,462 | 12/1971 | Holt | 104/105 |
| 3,630,390 | 12/1971 | Tax . | |
| 3,696,753 | 10/1972 | Ross et al. | 104/290 X |
| 3,696,947 | 10/1972 | Ponsen . | |
| 3,700,128 | 10/1972 | Noble, et al. | 105/154 X |
| 3,702,590 | 11/1972 | Corey | 105/154 X |
| 3,727,776 | 4/1973 | Meeusen . | |
| 3,760,739 | 9/1973 | Benner | 104/130 |
| 3,762,334 | 10/1973 | Larson | 104/130 X |
| 3,777,668 | 12/1973 | Corey . | |
| 3,780,666 | 12/1973 | Perrott | 104/105 X |
| 3,807,582 | 4/1974 | Anderson . | |
| 3,812,987 | 5/1974 | Watatani | 414/139 X |
| 3,815,510 | 6/1974 | Tourtellier | 104/104 |
| 3,830,163 | 8/1974 | Wright et al. | 104/105 |
| 3,834,315 | 9/1974 | Warner . | |
| 3,845,723 | 11/1974 | Jacobs, Jr. et al. . | |
| 3,878,792 | 4/1975 | Larson . | |
| 3,881,608 | 5/1975 | Hupkes . | |

(List continued on next page.)

Primary Examiner—Robert J. Spar
Assistant Examiner—Janice Krizek
Attorney, Agent, or Firm—Scully, Scott, Murphy & Presser

[57] ABSTRACT

The present invention provides a high productivity, high density container storage yard adjacent to a facility for loading and unloading containers, such as to and from ships, with the individual containers stored therein being stacked up to four containers high. An integrated container handling system is designed to move the containers from the container storage yard to the loading and unloading facility, and includes an overhead grid rail system on which container carrying shuttle vehicles are routed to designated yard locations by a master control system. Passive switching mechanisms are utilized to selectively move the shuttle vehicles through the grid rail network, wherein the actual switch mechanism is carried on the shuttle vehicle rather than on the track. One disclosed embodiment of the loading and unloading facility comprises overhead cranes and associated buffers in a marine terminal for loading and unloading a container ship. The present invention is also particularly applicable to intermodal facilities for transferring shipping containers between different types of container shipping systems, such as between container transport ships and rail cars.

16 Claims, 13 Drawing Sheets

U.S. PATENT DOCUMENTS

| | | | |
|---|---|---|---|
| 3,952,891 | 4/1976 | Terayama et al. | 414/137 |
| 3,956,994 | 5/1976 | Barry | 104/88 |
| 3,958,106 | 5/1976 | Bedford et al. | |
| 4,016,818 | 4/1977 | Ellzey | |
| 4,018,349 | 4/1977 | Hupkes | 414/139 |
| 4,094,252 | 6/1978 | Pater et al. | 104/130 |
| 4,106,639 | 8/1078 | Montgomery, et al. | 198/300 X |
| 4,136,789 | 1/1979 | Mulock Houwer | |
| 4,160,617 | 7/1979 | Montgomery et al. | 414/139 |
| 4,172,685 | 10/1979 | Nabeshima | 414/139 |
| 4,203,369 | 5/1980 | Perrott | |
| 4,245,561 | 1/1981 | Krug | |
| 4,280,411 | 7/1981 | Katayose et al. | 104/112 |
| 4,293,077 | 10/1981 | Makino | |
| 4,457,235 | 7/1984 | Fottner | |
| 4,498,399 | 2/1985 | Wakabayashi | 104/96 |
| 4,662,300 | 5/1987 | McCallum et al. | 414/626 X |
| 4,750,429 | 6/1988 | Mordaunt et al. | 104/88 X |

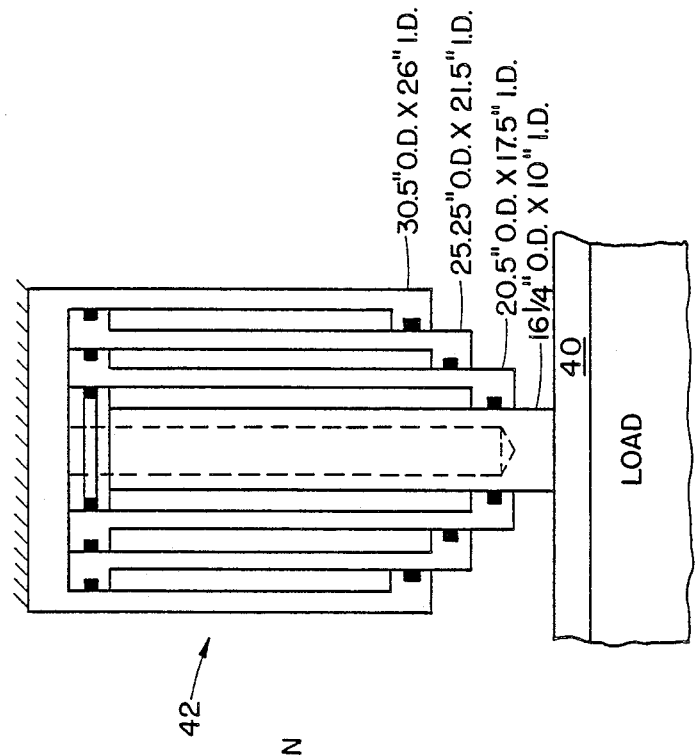
FIG. 9 TELESCOPING HYDRAULIC HOIST
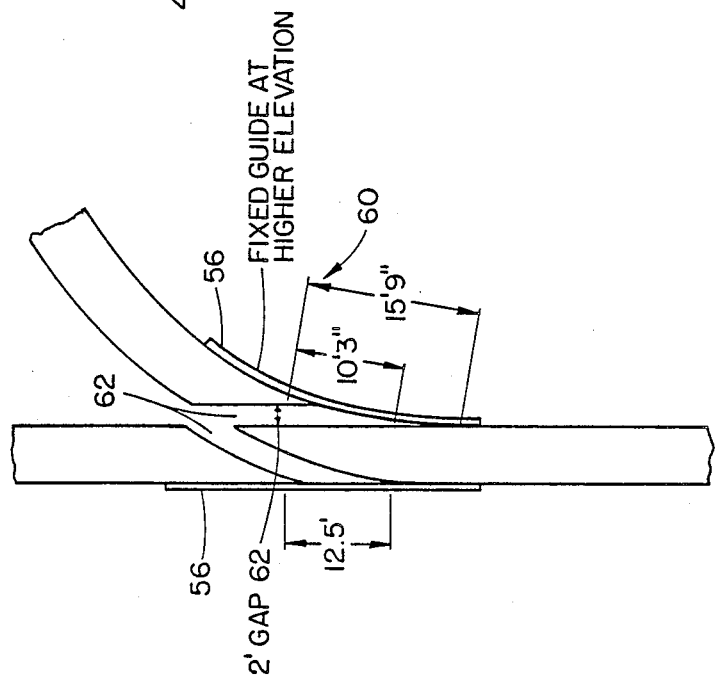
FIG. 6

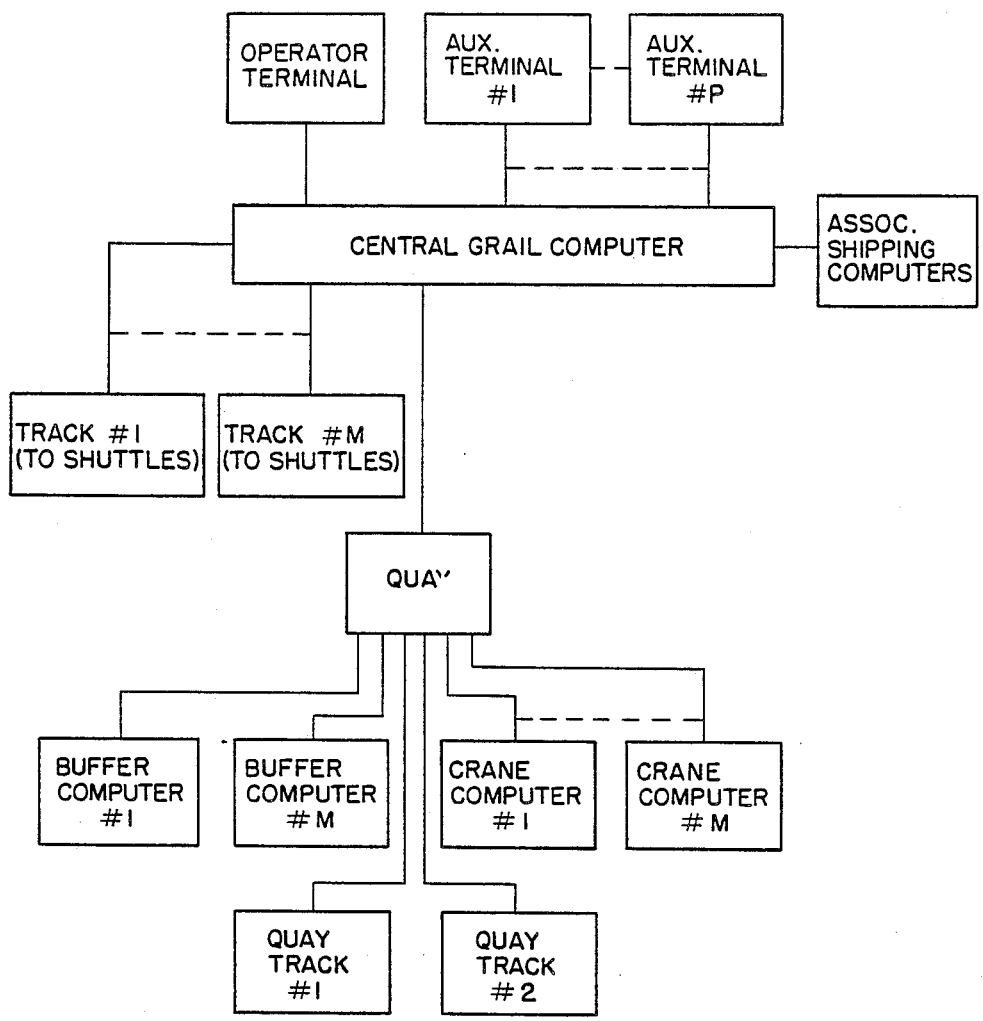
FIG. 12 BASIC BLOCK DIAGRAM OF GRAIL COUMPUTERS

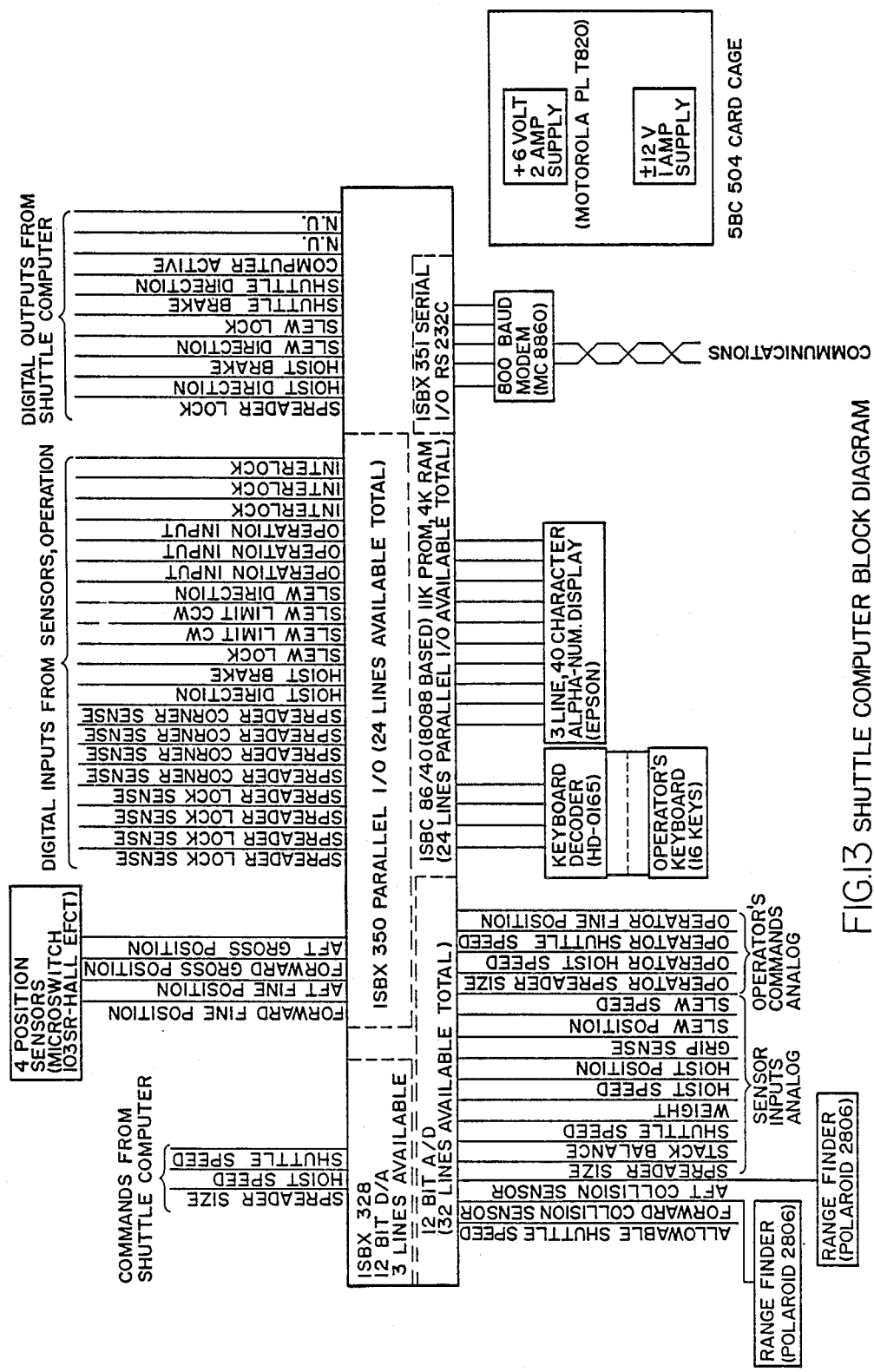
FIG.13 SHUTTLE COMPUTER BLOCK DIAGRAM

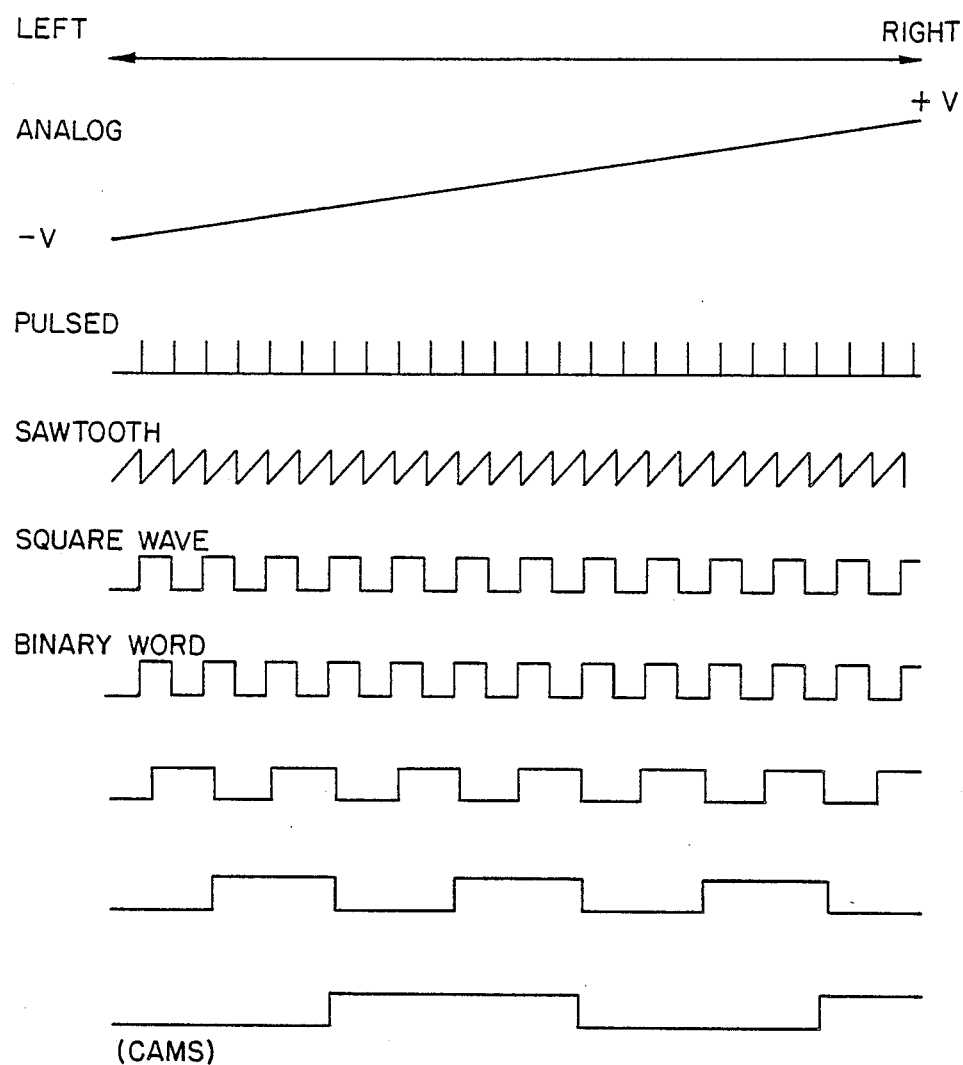
FIG.14 BASIC POSITIONING TECHNIQUES

GRID RAIL CONTAINER TRANSPORT AND STORAGE SYSTEM

This application is a continuation of application Ser. No. 857,833, filed Apr. 30, 1986, now abandoned.

BACKGROUND OF THE INVENTION

1. Field of the Invention

The present invention relates generally to a Grid Rail (GRAIL) high productivity, high density container storage yard system located adjacent to a facility for loading and unloading containers. More particularly, the subject invention pertains to a system as described which is designed for operation in any typical marine terminal container loading and unloading environment throughout the world and which is provided with an integrated container handling system for transporting containers between a stacked container storage yard and one or more shore cranes servicing the loading and unloading of a ship.

The present invention is also particularly applicable to intermodal facilities for transferring shipping containers between different types of container shipping systems, such as between sea shipping transports, rail shipping cars, and roadway shipping equipment. In such intermodal facilities, containers are frequently unloaded, such as from a container ship, and placed into temporary storage prior to being loaded onto other container transportation equipment, which may be the same type such as a second container ship, or may be different such as railway shipping cars. The present invention relates primarily to a high density container storage yard system for the temporary storage of containers being transferred in such intermodal facilities.

2. Discussion of the Prior Art

The prior art discloses many similar types of container handling and storage systems, and also discloses many subsystems similar to those disclosed and taught herein. For instance, U.S. Pat. No. 3,952,891 discloses a stacking yard with containers stacked three high, a shore crane, and a plurality of container handling cranes which load and unload containers onto truck chassis from the stack locations. U.S. Pat. No. 3,559,822 discloses a similar concept having both a honeycomb silo and a stacking yard, and uses a gantry crane to move the containers from the yard to a conveyor system.

U.S. Pat. No. 3,543,953 discloses an overhead rail system for moving containers from shore cranes to honeycomb silos, and for moving containers from rail or truck unloading points to either the shore crane or the honeycomb silo. U.S. Pat. No. 3,091,188 also discloses an overhead rail system having shuttles which move containers from railway cars to a ship, or from trucks to a ship, or from trucks to the railway cars, or vise versa. This reference teaches storage of the containers in a warehouse, not in a high density storage yard. Both of these references are generally directed to silo systems which are quite different in concept and organization from the present invention.

Computerized systems for automatically handling and routing containers are disclosed in U.S. Pat. No. 3,952,891, U.S. Pat. No. 3,559,822, and U.S. Pat. No. 3,543,952. However, these prior art systems do not utilize an intelligent shuttle of the same general type disclosed herein.

Additionally, various types of shuttles intended for use on an overhead rail system are disclosed in U.S. Pat. No. 3,700,128 in which a shuttle is utilized to interface rail, truck, ship, air or transit terminals and storage media. This patent speaks of common storage areas and high-density buffer storage, but does not disclose a concept similar to a high density container storage yard. In this patent, shuttle cars operate on an overhead rail system which runs transverse to the storage of the containers, with mechanisms being provided for rotating and lifting the containers. This shuttle uses a pair of bogies, but they are not independently rotatable as in the present invention. It should also be noted that this reference discloses a communication system for an automatic computer controlled container handling system. U.S. Pat. No. 4,280,411 discloses a shuttle car having a pair of independently rotatable bogies which travel on an overhead rail while supporting a container. U.S. Pat. No. 3,956,994 also discloses a somewhat complex shuttle capable of carrying two containers simultaneously, and the shuttle car is suspended from an overhead rail system.

The present invention utilizes a switching mechanism carried by each of the shuttles to interact with an overhead rail to provide switching of the shuttle from one track to another at junction points. The prior art discloses similar switching mechanisms. For instance, Holt, U.S. Pat. No. 3,628,462 discloses a vehicle switching apparatus and several switches and switch operating mechanisms. In each disclosed embodiment, vertically reciprocating pistons are used to drive a pair of guide rollers upwardly to engage a guide rail fitted immediately adjacent the intersection. U.S. Pat. No. 3,780,666 discloses a variety of relatively complicated systems for use in a passive switching network. Both single rail and double rail embodiments are disclosed, including reciprocating rollers in connection with a unirail system and an overhead monorail, and reciprocating rollers which engage a guide surface. U.S. Pat. No. 3,830,163 discloses a suspended monorail having vertically reciprocating pistons which engage or disengage a guide rail. U.S. Pat. No. 4,498,399 discloses a pair of switch tracks with a single rotatable element. U.S. Pat. No. 4,094,252 discloses a monorail design with a single switching element. U.S. Pat. No. 3,815,510 discloses a switch design wherein the number of rolling tracks are reduced at a switch blade point four to three. U.S. Pat. No. 3,762,334 discloses a monorail switch having a pivoting switch blade. U.S. Pat. No. 3,760,739 discloses an active switch utilizing a linear induction motor for switching a switch vane or blade.

Container buffer systems are also known in the prior art, and U.S. Pat. No. 3,812,987 discloses a two level buffer mounted on a shore crane to provide a two level, two stage buffer. Incoming containers are loaded onto one stage of the buffer, while outgoing containers are loaded onto the other stage of the buffer. Transfer between the truck chassis and the incoming buffer is provided by an intermediate gantry crane having a stabilized hoist. Individual transport carts are used for conveyance. U.S. Pat. No. 4,018,349 discloses a two-stage, single level buffer with separate stages for loading and unloading. A shore crane is equipped with two separately movable gantries, one for off-loading from the supply buffer to the ship and a second for loading to and from ground level. U.S. Pat. No. 4,106,639 discloses a separate structure for use as a buffer which is positioned immediately adjacent a large gantry crane which removes the containers from the buffer and places them in a container storage yard. U.S. Pat. No. 3,543,952 discloses a monorail system for picking up containers from a shore crane, and delivering them to a horizontal or transverse accumulating buffer. U.S. Pat. No. 4,172,685 discloses a single stage, one way buffer for receiving containers from a shore crane and dispensing them to a secondary gantry crane. Alternately, the buffer can be used to accumulate containers as the vessel is loaded.

Although the prior art discloses components and subsystems similar to those employed by the present invention, the prior art does not disclose an overall system similar to the present invention which provides a highly efficient container storage and handling system for a high density container storage yard.

SUMMARY OF THE INVENTION

Accordingly, it is a primary object of the present invention to provide a highly efficient grid rail container handling and storage system for operation at a terminal servicing the loading and unloading of containers.

A further object of the subject invention is the provision of a grid rail container handling and storage system which provides for high density storage of containers adjacent to shore cranes servicing the loading and unloading operations of ships, and which is capable of operation in a marine terminal environment at any anticipated worldwide location.

The present invention is also particularly applicable to intermodal facilities for transferring shipping containers between different types of container shipping systems, such as between container transport ships, rail shipping cars, and roadway shipping equipment. In such intermodal facilities, containers are frequently unloaded, such as from a container ship, and placed into temporary storage prior to being loaded onto other transportation equipment, which may be the same type such as a second ship, or may be different such as railway shipping cars. The present invention relates primarily to a high density container storage yard system for the temporary storage of containers being transferred in such intermodal facilities.

In accordance with the teachings herein, the present invention provides a grid rail container handling and storage system as described in which a container storage yard is provided with an overhead grid rail system providing access to different storage locations in the yard, and in which the containers are stacked one on top of the other. The grid rail system provides a plurality of access rails leading to different locations in the yard, and a passive overhead rail switch is located at each junction of the access rails.

In the context of a marine terminal, a loading and unloading facility is provided for a container ship docked adjacent to the container storage yard, with at least one container crane for loading and unloading containers on the ship. A buffer is positioned adjacent to each crane for the temporary storage of containers thereon, and the grid rail system provides overhead access rails extending to the buffers. A plurality of shuttle vehicles are provided for movement on the overhead grid rail system to different locations in the container storage yard, and each shuttle has an overhead container spreader bar mounted therebelow for releasably grasping a container. A container hoisting and lowering mechanism is coupled to the container spreader bar, such that the shuttle can grasp, and hoist or lower containers. Moreover, each shuttle has an active track switching mechanism for selectively switching the shuttle through the passive overhead rail switches.

In accordance with a preferred embodiment illustrated herein, the height of the grid rail system and shuttles above the yard is such as to enable the containers to be stacked up to one over four containers high in the storage yard, which allows a shuttle loaded with a container to travel over a stack of four containers high, or allows an unloaded shuttle to travel over a stack of five containers high. Moreover, the container hoisting and lowering means is mounted to a container slewing mechanism carried by the shuttle to enable a container held by the overhead container spreader to be slewed or rotated relative to the shuttle. Also, each shuttle is mounted onto the grid rail system by a set of mounting wheels towards each end of the shuttle, and each set of wheels is capable of rotating relative to the shuttle to enable the shuttle to traverse turns in the rails of said grid rail system. Each set of mounting wheels preferably includes four wheels, with two wheels being positioned on each side of the grid rail.

In one disclosed embodiment, the active track switching mechanism on the shuttle comprises a variable shuttle drive for each side of the shuttle, such that an increased driving force exerted on one side of the shuttle relative to the driving force exerted on the other side of the shuttle results in the shuttle executing a turning movement toward the other side. In another disclosed embodiment, the active track switching mechanism selectively offloads the load of the shuttle from the wheels at each end of the shuttle while the offloaded wheels are traversing a passive switch. In a further and preferred embodiment, the grid rail system includes a separate guide track along the load bearing rail through the passive switches, and the active switching mechanism on each shuttle vehicle selectively actuates a guide track engaging mechanism, such that the shuttle selectively engages the guide track through a passive switch along which the shuttle is to travel. In yet another disclosed embodiment, the active switching mechanism selectively disengages the shuttle mounting wheels on one side of the track while the wheels on that side are traversing a rail gap in a passive switch.

A preferred disclosed embodiment of the container hoisting and lowering mechanism utilizes a telescoping hydraulic hoist having a plurality of coaxially disposed hydraulic pistons of different diameters mounted one within the other in a hydraulic telescoping arrangement.

A preferred disclosed embodiment of a loading and unloading buffer includes two raised container supporting platform surfaces at different heights, and the containers are selectively laterally shifted along each platform surface by a plurality of selectively drivable conveyors located therealong.

The grid rail container handling and storage system is computer controlled for efficient operation, and includes several different computer control systems which exchange data and commands in a highly integrated computerized system.

In one preferred, contemplated embodiment of the present invention, the GRAIL yard automation system contains four major computer software modules including: (1) an Input/Output module; (2) a Yard Manager module; (3) a Data Base module, and (4) a Real Time Control System module.

The Input/Output module is a very significant module from an operator's standpoint as it provides an interface between the system and the operators. It effectively interprets the system's performance and presents it to the operator, and also interprets the operator's commands and presents them to the system. This module is therefore heavily communication oriented and contains a high level of human engineering with respect to controls and displays. The Yard Manager module is central to and controls the effective operations of the GRAIL yard. It contains a container placement submodule with an artificial intelligence algorithm for efficiently placing, storing and retrieving containers within the GRAIL storage yard. This submodule utilizes storage plan optimization techniques to minimize the number of times a particular container is handled and to minimize movements of container handling equipment during handling of containers. The Yard Manager module therefore is designed to minimize the cost and time of container handling.

The Data Base module provides the structure for all short and long term data retention for the GRAIL system. The Data Base communicates through a Data Base Manager submodule with a data base providing container data, customer information, and shipping data. The long term data bases include the container data base, the vessel data base, and the operations data base. The operations data base is further divided into the yard equipment data base, truck data base and the real time operations data base.

The Real Time Control System module comprises the control aspects of the automated system, and generates control signals for the motion systems using data from the Yard Manager module. Routing optimization, already accounted for in the Yard Manager, is refined in the control strategy. Feedback of the motion systems instantaneous conditions are provided for safety purposes, and collision detection and avoidance are a part of the safety aspects of this module.

The Real Time Control System transmits data and commands to each shuttle, each buffer, and each crane. Each shuttle includes a shuttle computer for controlling operations of the shuttle, and for receiving and transmitting data and commands with the system control computer. Moreover, each crane is provided with a crane control computer for controlling operations of the crane, and for receiving and transmitting data and commands with the system control computer. Also, each buffer is provided with a buffer control computer for controlling operations of the buffer, and for receiving and transmitting data and commands with the system control computer.

The grid rail system also provides positional marker information at locations along the rails, and each shuttle reads the positional marker information and transmits this data to the system control computer.

BRIEF DESCRIPTION OF THE DRAWINGS

The foregoing objects and advantages of the present invention for a grid rail container transport and storage system may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 6 illustrates a plan view of one exemplary embodiment of a passive switch for the grid rail system;

FIG. 9 is an exemplary embodiment of a telescopic hoist designed to hoist and lower containers, such as may be carried by a shuttle, while minimizing sidesway movements of the container;

FIG. 12 illustrates an exemplary architectural block diagram of a computer control system for the GRAIL system;

FIG. 13 is an exemplary block diagram of a computer controlled shuttle system; and FIG. 14 illustrates several exemplary waveforms useful in explaining several shuttle positional determining systems.

DETAILED DESCRIPTION OF THE DRAWINGS

Figure 1:
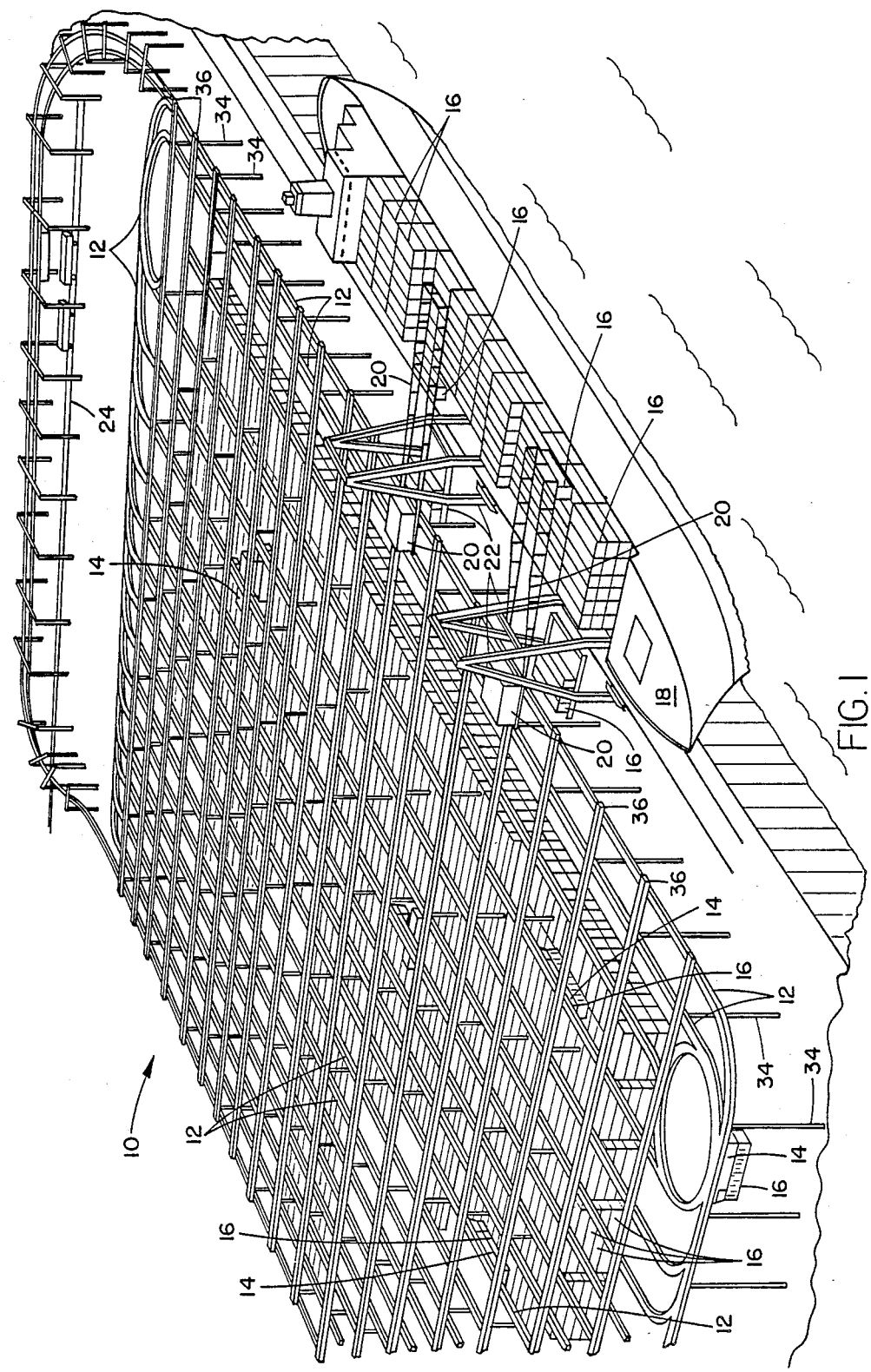
FIG. 1 illustrates a perspective aerial view of a high density container storage yard showing an exemplary overhead grid rail system, with shuttle vehicles traveling thereon and carrying cargo containers to and from a ship having two shore cranes for loading and unloading thereof and a buffer servicing each crane.

Referring to the drawings in detail, FIG. 1 illustrates a perspective aerial view of a high density container storage yard 10 showing an exemplary overhead Grid Rail (GRAIL) system 12, with shuttle vehicles 14 traveling thereon and carrying cargo containers 16 to and from a ship 18 having shore cranes 20 for loading and unloading thereof and a buffer 22 servicing each crane. In this embodiment, the individual containers stored in the yard are capable of being stacked up to one over four containers high. Different embodiments of the present invention might utilize different numbers and arrangements of cranes and overhead tracks servicing the cranes, with there generally being a trade off between the number of cranes and tracks.

Figure 2:
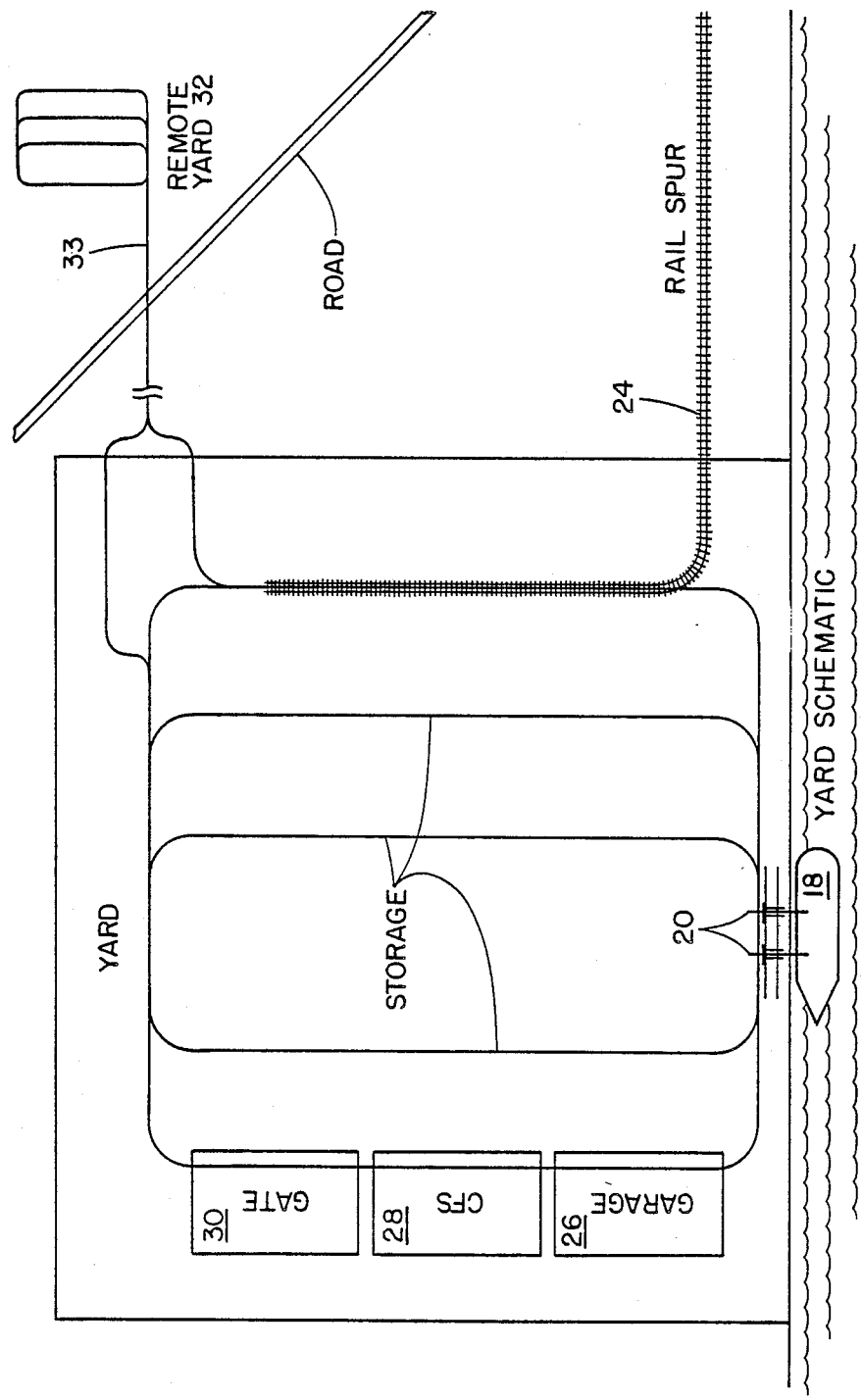
FIG. 2 is a schematic illustration of a second exemplary embodiment of a high density container storage yard having a slightly different configuration from that shown in FIG. 1, and particularly illustrates an intermodal facility, with provision for access to a remote container storage yard.
Figure 5:
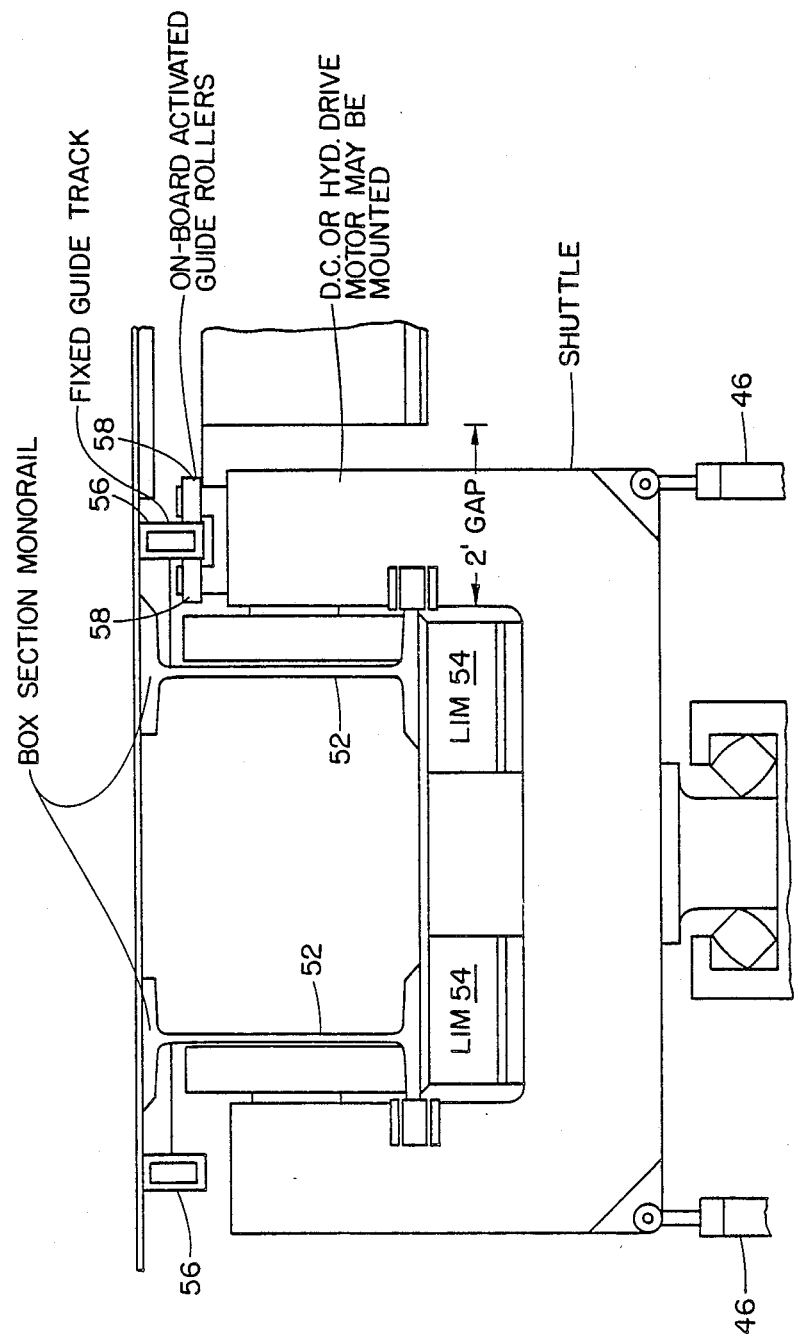
FIG. 5 is a sectional view of one exemplary embodiment of an overhead rail system and the structure of the shuttle interfacing therewith.
Figure 8:
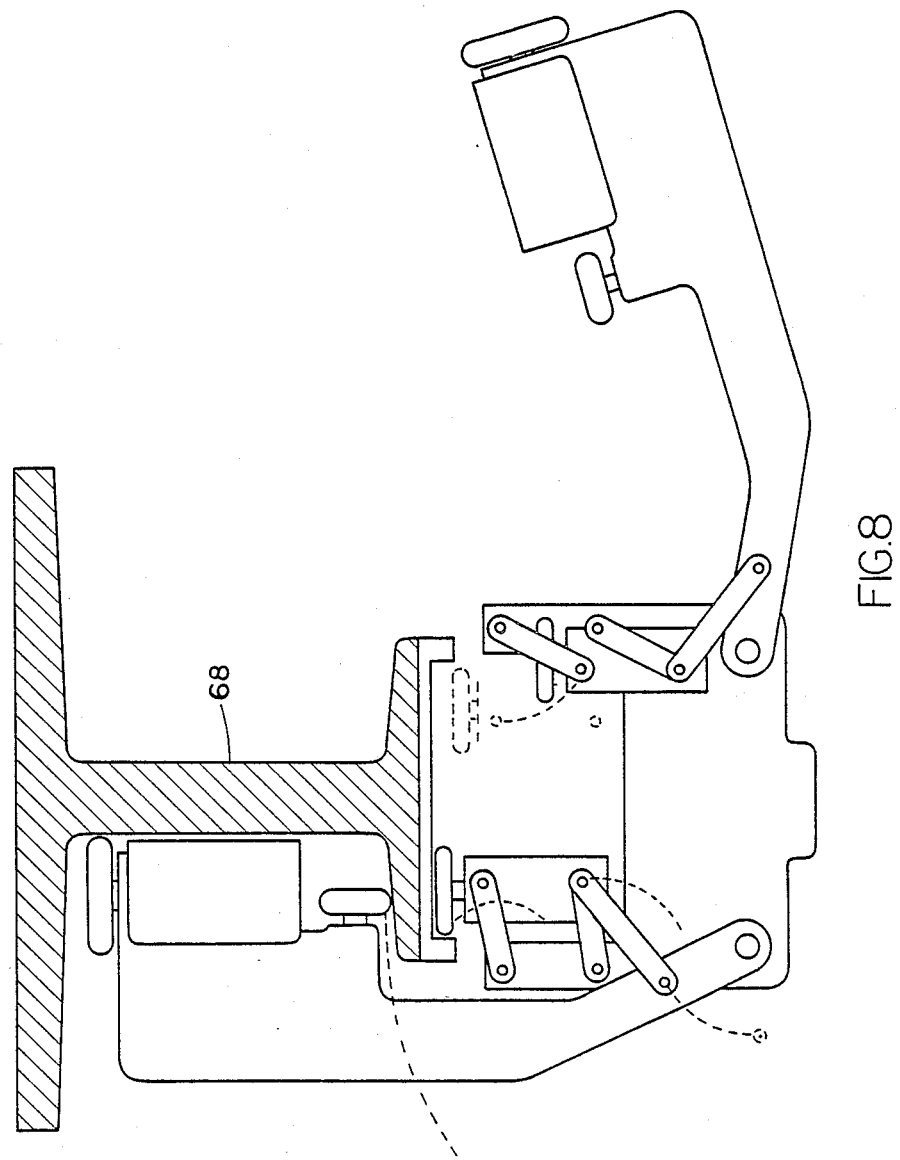
FIG. 8 illustrates a sectional view through another embodiment having an overhead monorail, and illustrates an active switching mechanism on the shuttle for engaging the shuttle wheels with the monorail while traversing a passive switch.

The present invention provides an integrated container handling system designed to move the containers between the container storage yard and the buffer shore cranes. The overhead Grid Rail system on which the container carrying shuttles travel can comprise overhead monorails, as illustrated in FIG. 8, or modified box section rails as illustrated in FIG. 5, or any suitable overhead rails extending to all container storage locations in the yard and to all locations the containers are transported such as the buffers 22, an adjacent rail spur 24, a garage 26, a Container Freight Station (CFS) 28, a gate 30, and a remote container storage yard 32. FIG. 2 illustrates schematically a second embodiment of a typical yard layout, and many alternative yard layouts are possible depending upon the particular marine terminal in which the grid rail system is installed.

The embodiments of FIGS. 1 and 2 illustrate the intermodal nature of typical GRAIL facilities wherein the GRAIL system provides overhead access rails to a rail spur 24 such that containers can be loaded and unloaded onto unitrain carriers such as Container On Flat Car (COFC) and double stack cars for transfer of the containers between a ship and the rail carriers. A similar facility can also be provided for truck carriers for the transfer of containers to and from truck chassis, which can simply be a facility underneath one of the overhead rails where a truck chassis can be temporarily parked for transfer of a container to or from a shuttle.

FIG. 2 also illustrates a remote container storage yard 32 connected to the main GRAIL storage yard by one or more overhead access rails 33 extending between the respective storage yards, which may cross intervening public streets The remote storage yard can be designed to be similar to the main GRAIL storage yard as illustrated in FIG. 1, but normally is designed to be a less active yard which is interfaced with the main storage yard for longer term storage of empty and less active containers.

The overhead rail system is supported overhead by suitable vertical supports 34, and can also include transversely positioned overhead support beams 36.

Passive switching mechanisms are utilized at junctions of the rails as described in greater detail hereinbelow to selectively move the shuttles through the grid rail network, wherein the actual switch mechanism is carried on the shuttle rather than on the track. The container buffers 22 are provided between the overhead rail system and the shore crane to temporarily accumulate containers that are being loaded and unloaded, to provide for asynchronous operation of the shuttles, and to provide for last minute changes in order of loading or unloading thereof.

The GRAIL system described herein is designed to operate in a marine terminal environment at any anticipated worldwide location, including those in earthquake, typhoon and hurricane regions, produce thirty two moves per hour/per crane in berth productivity (overall average per worked vessel) with a one-way operation utilizing a conventional container crane working with a conventional cargo vessel, and obtain yard storage densities of two hundred or more standard containers per acre.

The shuttles 14, with an estimated shuttle weight of eighty thousand pounds, are preferably capable of carrying a fully loaded container at forward and reverse travel speeds of twenty-three feet per second, at an acceleration of three feet per second/per second, provide a container hoisting or lowering speed of seventy feet per minute, a container lowering speed of one hundred twenty-five feet per minute, is capable of rotation in ten seconds (maximum for 90° turn), and has a 360° rotational capability with no unwinding requirements, primarily for working with reefers. The turning radius of the shuttle is preferably a maximum of forty-six feet at five miles per hour velocity. Typical maximum physical characteristics of the shuttle are a weight (less container) of eighty thousand pounds, a maximum width of eight feet, six inches, and a maximum length of sixty feet. The shuttle preferably has an operator override capability for all functions, but otherwise can be fully automated.

The shuttle is microprocessor controlled to pick up and place containers anywhere in the yard in accordance with the tasks assigned thereto, to avoid collisions and other unsafe situations, to identify location addresses, to report operating status and location, and to report faults (including subsystems) to a control center.

The overhead grid rail preferably incorporates power and signal buses, and the track is marked for precise shuttle positioning. The grid rail system is preferably designed such that sidesway during lowering and hoisting operations is less than one half inch in winds gusting to twenty mph, and the turns thereof shall be designed to withstand fully loaded shuttle speeds of twenty feet per second.

In the illustrated embodiment wherein the containers are stacked four high, the track preferably provides a minimum vertical ground clearance of forty feet from the underside of the container and shuttle, with the container being loaded to one hundred twenty percent capacity and the container being nine and one half feet high. The structural design of the grid rail system preferably should not constrict motions as to maximum distance between shuttles on a single track or adjacent tracks.

Figure 3:
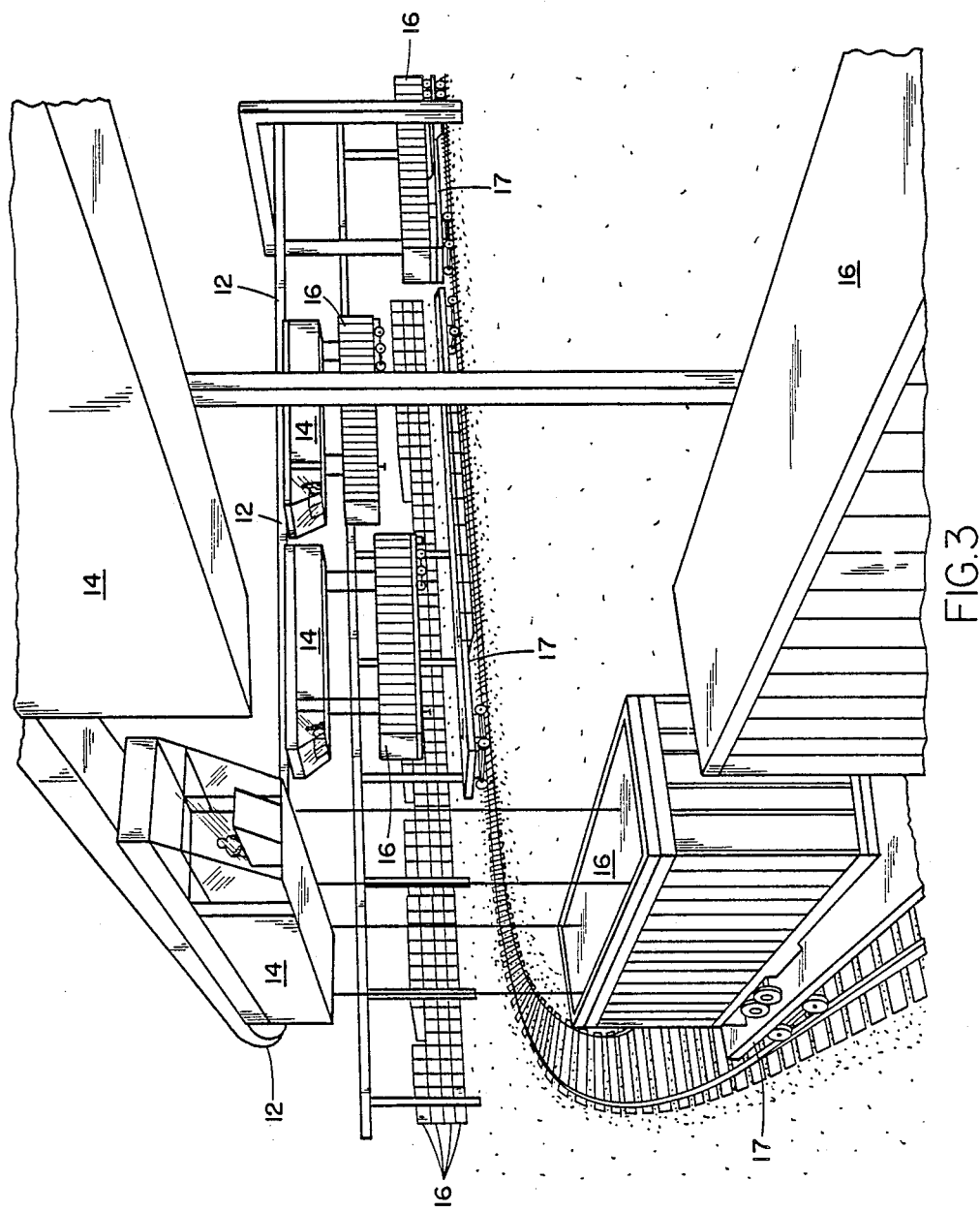
FIG. 3 is a pictorial illustration of an intermodal facility in which containers are picked up or delivered at a rail spur by the shuttle vehicles operating on an overhead rail above the spur.

FIG. 3 is a pictorial illustration of an intermodal facility in which an overhead rail extends and runs along an associated rail spur, such that the shuttle vehicles 14 can easily pick up or deliver containers 16 from or to rail cars 17 on the rail spur.

Figure 4:
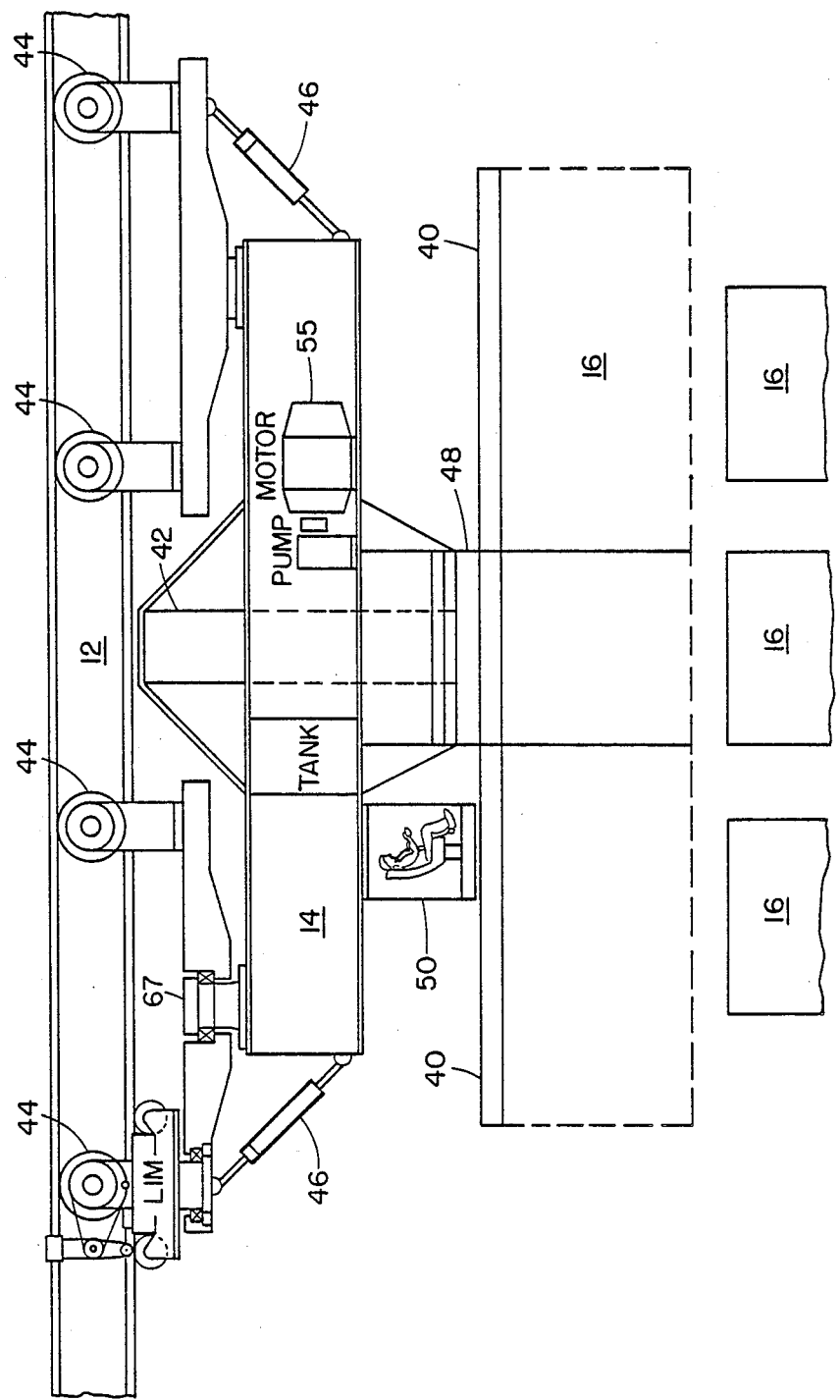
FIG. 4 is an elevational view of one individual shuttle vehicle supported by an overhead rail and transporting a container carried therebelow.

FIG. 4 is an elevational view of one individual shuttle vehicle 14 supported by an overhead rail 12 and transporting a container 16 carried therebelow. The containers are selectively grasped and released by a telescoping spreader bar mechanism 40. An Automatic Spreader Bar Control (ASBC) system preferably locates the container after the shuttle has positioned itself overhead to within six inches of the container. The shuttle then automatically slews and lowers the spreader bar, engages the container, and raises the container to the travel position. To lower the container, a reverse process is followed. The ASBC System preferably is interfaced with the shuttle control microprocessor.

The shuttles are the workhorses of the system and are used to move containers, stack containers, lift, lower and slew (rotate) containers, and present an inexpensive and efficient arrangement for handling shipping containers in a yard. The GRAIL system permits rapid access and transport of containers. The shuttle's height above the ground reduces the time needed in placing/retrieving containers from stacks of other containers or from raised platforms such as in the buffer. The shuttle preferably uses a telescoping mechanism 42, which can be hydraulically powered, to raise and lower the spreader (and container). A telescoping mechanism as taught herein has advantages because it is rigid, and minimizes unwanted motions while maximizing positioning accuracy.

The hydraulically actuated telescopic hoist 42, FIG. 9, can be used with the GRAIL shuttles, gantry cranes, shore cranes, etc. for raising and lowering the containers. Normally containers are raised and lowered using cable systems, which are subject to unwanted motions such as roll, pitch and yaw. Moreover, these motions may damage the cargo and equipment, thereby reducing productivity, and also such systems cannot normally operate on very windy days. The inventive telescopic hoist solves these problems because it is rigid and allows accurate and steady positioning, thus increasing productivity and reducing the risk of damage. In addition, the telescopic hoist makes slewing (rotating) the container more practical than other designs because only the spreader must be slewed, which is an important feature of the GRAIL system. The hydraulically actuated telescopic hoist can be designed to prevent unintentional rotation of the load, for instance by noncircular designs for the hydraulic pistons and cylinders, or by guide keys and locks, or by external dog linkages. FIG. 9 gives the design dimensions of one telescoping mechanism designed to hoist a forty ton container with a ten foot off-center center of gravity in a fifty mile per hour wind.

The hoist of FIG. 9 was designed for one over four containers, although the dimensions could be modified. The hydraulic hoist is rigid and allows very accurate positioning of the shuttle on the track, which is important in automated hoisting operations.

A container identification reader is also preferably provided to read a number from the container, transmit it to an associated computer, and simultaneously display the number for verification. The identification numbers are preferably provided at any one of five locations in the front and rear doors of the containers. The numbers can be vertically or horizontally arranged in up to three groupings, and consists of up to sixteen alpha numeric characters.

The shuttle preferably runs on four sets of wheels 44 that straddle a monorail. The wheels can be steel wheels, and a thirty inch diameter steel wheel is suitable in one designed embodiment. Actuators 46, which may be hydraulically powered, are used to selectively off-load the wheels, permitting passive switching on the grid rail by the shuttle.

The shuttle permits containers to be slewed at least 90 degrees, by rotating only the container and the spreader mechanism. In this embodiment, only the container and spreader slew, and a slewing ring 48 is mounted directly on the spreader. The operator's cab 50 does not slew with the container, although it can rotate about its own axis. The operator has a clear field of view when the containers are stacked approximately two feet apart.

FIG. 5 illustrates a cross section of a box section monorail 52. Either Linear Induction Motors (LIM) 54, DC motors or hydraulic drive motors are possible in different embodiments. When a hydraulic hoisting system is employed, a hydraulic propulsion system would allow the same motor 55, FIG. 4, to be used for both hoist and propulsion. A fixed guide track 56 shown in FIG. 5 is only necessary during switching operations. During switching operations, rollers 58 are activated which straddle the guide track to prevent lateral movement of the drive wheels.

A major feature of the shuttle of the present invention is its ability to switch tracks passively. FIG. 6 shows a plan view of a passive switch 60 from above, in which the track has no moving parts, but has two foot wide gaps 62 at switch points to permit the shuttle structure to pass. During passive switching, the wheel or wheels over the gap are not supported by the track. The hydraulic actuators 46 off-load the wheels while the other wheels support the shuttle and the load. When the wheels 44 cross a gap, the appropriate guide wheels 58 engage the fixed guide track, which allows passive switching to be performed by the shuttle. For example, referring to FIG. 6, if the shuttle is located at the bottom of the drawing and is required to travel straight, it activates its left guide wheels and its support actuators. Conversely, to turn to the right, it activates its right guide wheels. In addition, the shuttle can be steered toward the proper direction by controlling the thrust of the drive mechanism, such as a LIM. For example, to move to the left fork, the left LIMs reduce their thrust while the thrust on the right LIMs is increased. In this embodiment one side of the shuttle crosses the gap where there is no rail along one side, and if the tracks are only one foot apart, the gap would be about six feet, which means that one entire side would always be supported while thirty-four feet, of a forty foot long shuttle, would be supported on the gap side.

Figure 7:
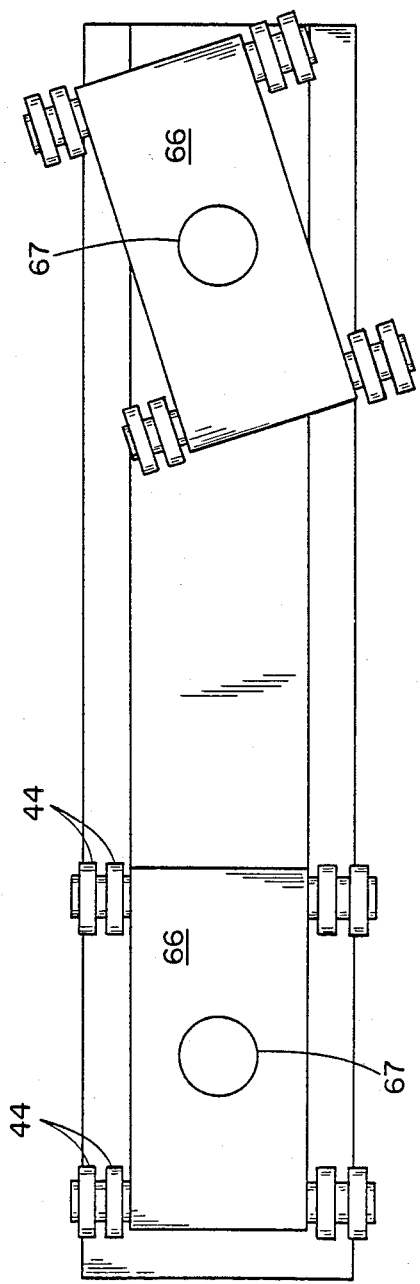
FIG. 7 illustrates the pivotal nature of the shuttle supporting wheels on bogies, showing how the bogies pivot while the shuttle is traveling along a curve.

FIG. 7 illustrates the pivotal nature of the shuttle supporting wheels 44 which are mounted on bogies 66 which pivot about rotational pivots 67 while the shuttle is traveling along a curve. The wheels 44 of this embodiment are designed to ride on a track 52 as illustrated in FIG. 5.

FIG. 8 illustrates a sectional view through another embodiment having an overhead monorail 68, and illustrates a further embodiment of an active switching mechanism on the shuttle for engaging the shuttle wheels with the monorail while traversing a passive switch. In this embodiment, the shuttle support and guide wheels are selectively removed from one side of the monorail 68. If for instance the active switch wheel positions of FIG. 8 were assumed while the shuttle is traversing the passive switch of FIG. 6 approached from the bottom, the shuttle would proceed straight through the passive switch 60. If the active switch wheel positions of FIG. 8 were reversed, the shuttle would turn toward the upper right fork. In this case, the rail can be solid with no required breaks therein.

Figure 10:
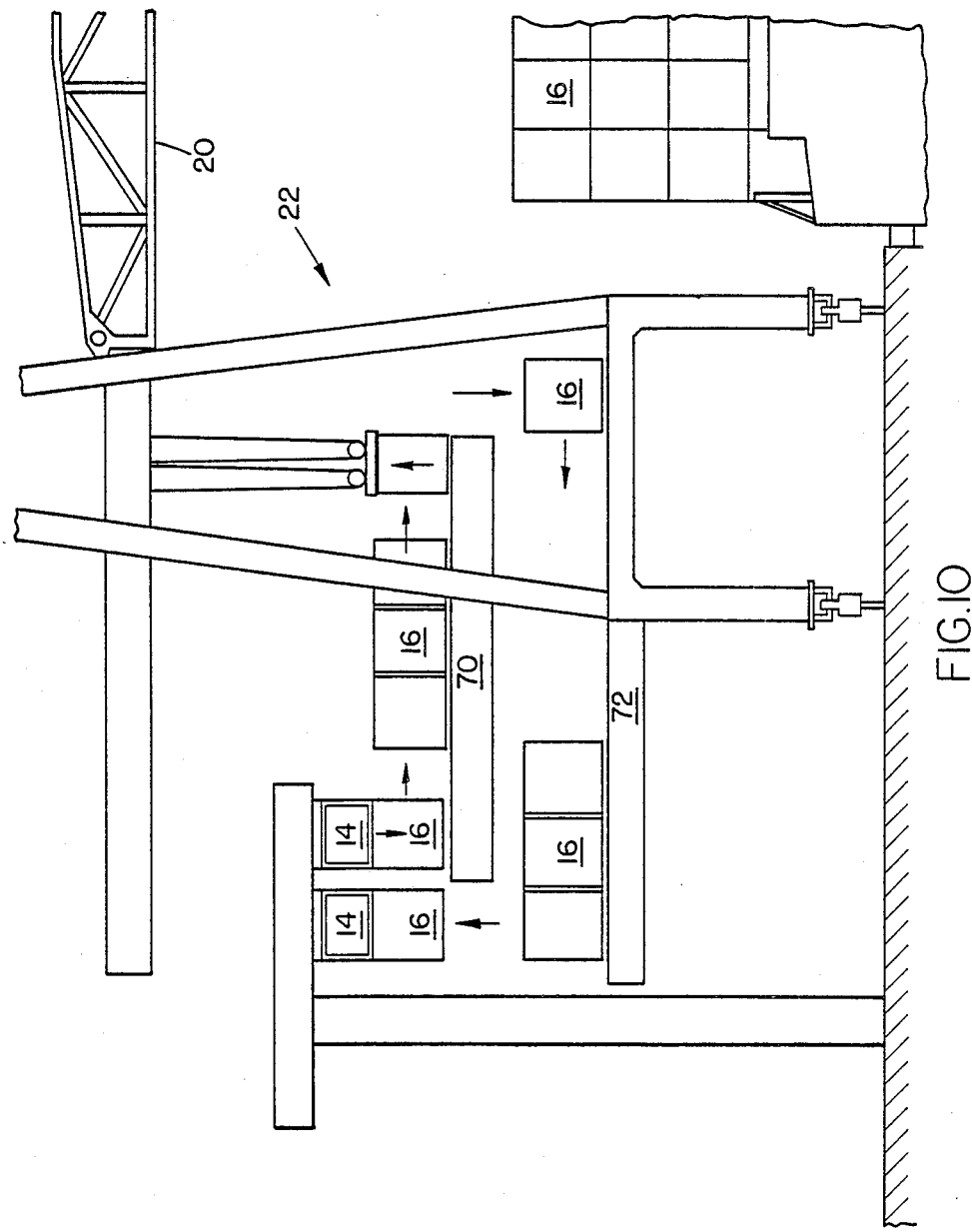
FIG. 10 is an exemplary embodiment of a buffer interface between a shore crane loading or unloading a ship and containers being transported thereto as by shuttles traveling to and from the container storage yard.
Figure 11:
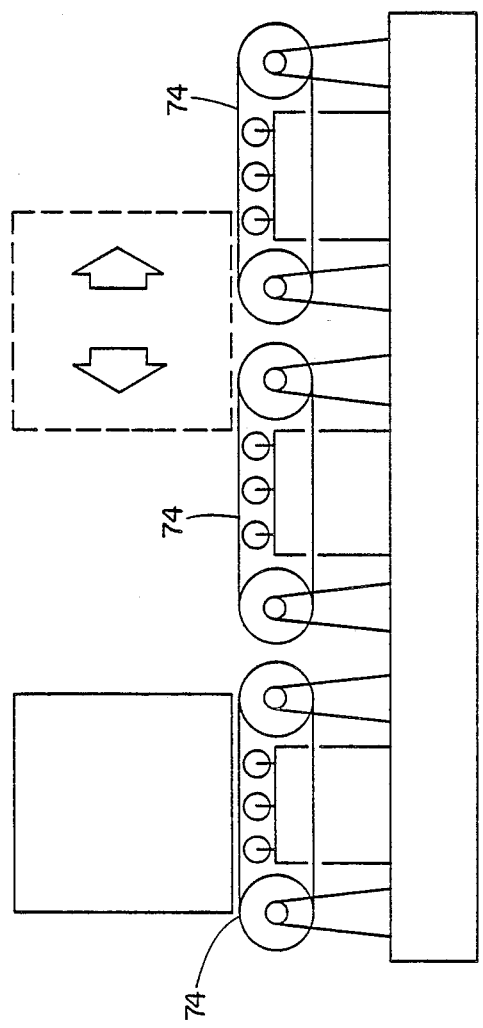
FIG. 11 illustrates an exemplary embodiment of a container transport mechanism on a buffer interface.

A buffer system 22 as illustrated in FIGS. 10 and 11 is used to interface between the container yard and the ship. Containers are placed on the buffer by the GRAIL shuttles 14 or by hoists or other means. They are automatically indexed to convenient locations on the buffer (normally the closest position to the point of removal). The device that removes them, such as the shore crane, has random access to any container on the buffer, except those under the shuttle, thus relieving the devices that load the buffer from doing so in strict order.

In loading a ship with the buffer providing for two way moves as illustrated, the shuttles deliver containers 16 onto a buffer upper raised platform 70 located as close as possible to the shore crane. In unloading a ship, the crane 20 delivers containers 16 onto a lower raised platform 72. Each platform is capable of shifting the containers along its length between the shuttle track and the shore crane in order to clear a space for the next shuttle delivery, and to adjust the container's location such that the crane operator can pick up the container from the same location during each cycle. Since the buffer is capable of handling several containers at once, the crane operator can correct out-of-sequence arrivals of containers, thus eliminating the need for the shuttles to synchronize their activities with the shore crane. The buffer is elevated, which reduces the hoisting time, and since the buffer automatically positions the crane's next container in the same location, it reduces the difficulty and time required for the crane operator to set the spreader in position on the container. As illustrated in FIG. 11, the buffer can employ individual belts or treads 74 to move the containers such that each container can be moved independently of the other containers. In an alternative embodiment, the containers can rest on continuous support rollers, and the containers can be moved through the use of an alternative mechanism such as a hook and winch which draws the hook and container along the buffer.

The buffer illustrated in FIG. 11 provides flexibility in that it can move one or up to all of the containers in one shift cycle. This feature greatly improves the speed of the buffer, which can also be designed as a two way buffer.

In preferred embodiments, the buffers are normally independent structures, detachable from associated structures such as cranes, so that one buffer might be utilized with any crane.

A computerized command, control and communications system determines and controls the activities of the GRAIL automatic container shipping facility. The computerized system accepts commands and inquiries from other computer systems, user workstations, and subsystems in the automated yard. The system includes at least one central computer, distributed computers in the subsystems, and the controls and sensors needed to operate the system and its subsystems. The system consists of the central computer with an interface to a central data base, and interface and control of associated subsystems such as several workstations, several shuttle computers, and quay computers such as the buffer computers, shore crane computers, and quay track computers.

The computerized system accepts data from associated shipping computers, and converts the information into commands that efficiently control the GRAIL system operation and communicates those commands to the GRAIL subsystems. A general block diagram of one embodiment of this system is shown in FIG. 12, which includes a central GRAIL computer, an operator terminal, auxiliary terminals, associated shipping company computers, and associated quay computers, such as buffer computers, crane computers, and quay tracks. The central GRAIL computer communicates with the associated shipping computers, such that stowage plans, yard inventory, gate activity, manual actions and GRAIL activities in general can be communicated between the computer systems. The GRAIL system also communicates with a number of terminals, the operator terminals, and other terminals located throughout the GRAIL facility. These terminals may be located at the gate, quay, garage or any facility which requires access to the GRAIL computer for commands or reporting.

A preferred embodiment of the GRAIL system disclosed herein employs passive track switches. However, if active switches were utilized instead, each track switch in the GRAIL system would have its own microcomputer to report to the central GRAIL computer on the status of the switch and the tracks leading to the switch, which is required for safe and efficient routing of the shuttles. The GRAIL computer preferably has a communication link to each track. The tracks themselves are not computerized but pass the communications to the shuttles, each of which has a computer to control the propulsion, the hoist, slewing, communications with the operator, etc. The communications with the shuttles are preferably in real-time and operate on an interrupt basis. That is, the GRAIL computer preferably deals with shuttle and other events as they occur, and gives priority to these requests over requests from the terminals.

The quay computers communicate with the central computer and control the activities of the quay subsystems such as the buffers, the quay tracks, and the cranes. The quay computers reduce the real time load on the GRAIL computer by handling the quay assignments, communication switching and positioning components. The quay tracks are included under the commands of the quay computer because of the additional activity on those tracks and the need to coordinate between the quay components and the shuttles.

FIG. 13 illustrates one possible embodiment of a shuttle computer control system, illustrating typical data inputs and outputs and control and information inputs and outputs for the shuttle computer. The block diagram for a shuttle computer as presented in FIG. 13 is based on a single board computer, based on the Intel ISBC 88/40. This diagram also illustrates details of hardware components that can be used in the GRAIL system. As shown, the shuttle computer includes 24 parallel digital input/output lines for sensors, control, operator input and display. A 32 line analog to digital converter is included to process the shuttle's many analog sensors. The analog commands from the computer are sent to the spreader, hoist, etc. via an 8 line digital to analog converter. The computer communicates with the central computer via an RS232C serial input/output port.

The block diagram details the input/output arrangements for one embodiment of the shuttle computer. A brief discussion of each line to/from the illustrative embodiment of the shuttle computer control system is presented hereinbelow:

Allowable Shuttle Speed. This is an analog signal line which sets a maximum speed for the shuttle, and can be a voltage level on the track block in which the shuttle is traveling. For example, in a straight section of track the signal may always be 10 volts which allows a 100% shuttle speed to be permitted in this block. In a curved section of track, the signal may be only 5 volts to limit the shuttle to 50% of maximum speed. The yard computer controls the signal, and may in some instances, usually for safety, drop the signal to 0 volts to tell the shuttle it must stop.

Forward Collision Sensor. While the previous signal should prevent collisions, the shuttles are also provided with on board collision detectors, which can be similar to photographic range finders. These, and similar devices detect and measure the distance of any object in the path of the shuttle. The shuttle software recognizes any dangerous situation, limits the shuttle's motion, and reports any problem to the yard computer.

Aft Collision Sensor. Similar to signal above (Forward Collision Detector).

Spreader Size. This is an analog signal input which feeds back the current size of the spreader bar (which must be set to a particular size depending on the size of container to be picked up).

Stack Balance. This is an analog input which is part of an alarm system to detect major imbalance in the container that might damage the shuttle or container.

Shuttle Speed. This is speed feedback required for the speed control system.

Weight. This is a measurement system mainly for safety reasons. The system has a maximum carrying capacity. This sensor will provide the information required by the software to determine any problems. The weight sensor is also used to help verify that the correct container is picked up. For example, the weight measured must be similar to the weight reported by the data base.

Hoist Speed. Feedback for the hoist control system.

Hoist Position. Feedback for the hoist control system.

Grip Sense. Signal used to sense that the spreader has proper control of the container.

Slew Position. Feedback for the spreader rotation control system.

Slew Speed. Feedback for the spreader rotation control system.

Keyboard. Four digital lines are required for the operator control panel inputs.

Display. Approximately ten digital lines are required for the operator's display.

Modem. Approximately five digital lines are required for the communications system.

Spreader Size. This is an input command from the operator or another computer to control the size of the spreader The signal goes into the shuttle computer for limiting or further processing.

Hoist Speed. This is an input command from the operator or another computer to control the speed of the hoist. The signal goes into the shuttle computer for limiting or further processing.

Shuttle Speed. This is an input command from the operator or another computer computer to control the speed of the shuttle. The signal goes into the shuttle computer for limiting or further processing.

Forward Fine Positioning. This is feedback from the track to indicate that the shuttle is exactly over a pick up location. Located at the rear of the shuttle.

Aft Fine Positioning. This is feedback from the track to indicate that the shuttle is exactly over a pick up location. Located at the rear of the shuttle.

Forward Gross Positioning. This is feedback from the track to indicate where the shuttle is located in the yard. Sensors are located at the front portion of the shuttle.

Aft Gross Positioning. This is feedback from the track to indicate where the shuttle is located in the yard. Sensors are located at the aft of the shuttle.

Spreader Lock Sense. These four digital input lines are required to sense that the spreader has locked into position on each of the four container corner posts.

Spreader Corner Sense. These four digital input lines are required to sense that the spreader has been positioned over the four container corner posts.

Hoist Direction. Override command from operator for the direction of the hoist.

Hoist Brake. Override command from operator for the braking of the hoist.

Slew Lock. Command to lock the slewing mechanism when it reaches the desired rotation.

Slew Limit CW. Signal from a limit switch to signal the computer that the slewing mechanism has reached its full clockwise position.

Slew Limit CCW. Signal from a limit switch to signal the computer that the slewing mechanism has reached its full counter-clockwise position.

Operator Input. Three lines are reserved for operator inputs.

Interlock. Three lines are reserved for various interlocks. For example one interlock may indicate that the operator's door is open.

Spreader Lock. Output from shuttle computer to lock the position of the spreader.

Hoist Direction. Output from the shuttle computer to set the direction of the hoisting mechanism.

Slew Direction. Output from the shuttle computer to set the direction of the slewing mechanism.

Slew Lock. Output from shuttle computer to lock the position of the slewing mechanism.

Shuttle Brake. Output from shuttle computer to lock the position of the shuttle.

Shuttle Direction. Output from the shuttle computer to set the direction of the shuttle propulsion system.

Computer Active. The computer must change the state of this line at least every x seconds. If not, the computer is assumed to be malfunctioning and an alarm and emergency control system takes over command of all systems, which might be a redundant computer system identical to the shuttle computer.

In one preferred, contemplated embodiment of the present invention, the GRAIL yard automation system contains four major computer software modules including: (1) an Input/Output module; (2) a Yard Manager module; (3) a Data Base module, and (4) a Real Time Control System module.

The Input/Output module is a very significant module from an operator's standpoint as it provides the interface between the operators and the system. It effectively interprets the system performance and presents it to the operator, and also interprets the operator's commands and presents them to the system. This module is therefor heavily communication-oriented and contains a high level of human engineering with respect to controls and displays. A user interfaces with the system through a series of workstations, with each workstation being designed for maximum performance within a specific task. Workstation conrols, input keys and displays are designed to provide the user with a minimal set of functions for effective job performance. The workstation controls and displays vary with the workstation type. For instance, controls can range from a series of mechanical switches to a full alphanumeric keyboard. Displays can include simple single lamps to indicate an off/on condition to a color graphics display. Additional outputs may be derived from printers or plotters for report and statistics generation.

A color graphics container/yard monitor can be used in some embodiments to provide an operator with rapid, easily understood information on the status of the yard and its contents. The contemplated system uses color graphics to achieve its purpose, and provides an overhead view of the container yard in which each container can be seen. The user can select from a menu the features about the container or the yard that are of interest. For example, the user can view the yard in terms of container weight, discharge port, type of container, etc. When a choice is made, the containers on the screen are color coded according to their attributes. For example, if the user selected weight, the containers would be colored according to weight. White may mean that the container is empty, while red may indicate that the container weighs more than 25 tons. Other colors would indicate other weights. The user may also request information on the container handling equipment in which case the shuttles, cranes, etc. would appear on the screen in positions that indicate their current positions in the yard and their current activity. As the equipment in the actual yard moved, the symbols on the screen would move also.

The user has at least one other screen view he can select to allow the user to "zoom" in on a particular group of containers. In this mode, the user has the same features available (e.g., color containers vs. container attributes), however, more information is provided, such as weight, destination, serial number etc. In both modes, the user can select a particular container by using a pointer, such as a light pen or joystick. The system will then display detailed information about that container. For example, information may include yard location, destination, origin, weight, contents, type of container, ship etc. If the user knows the container's serial number, but does not know its location in the yard, the system will mark its location on the screen and display detailed information about the container.

Based on their operating functions, work stations are divided into three groups. These include: (1) Data Stations; (2) Operations Stations, and (3) Control Stations. Data stations are located in the yard computer office area, and include the Yard Manager stations and Yard Programmer stations. Data Entry devices at these stations are highly interactive and flexible to support massive on-line data entry, analysis and reporting. The operations stations are distributed in various points in the yard area and are used by yard personnel to perform the yard monitoring and control functions. The data entry devices used in these stations can be rugged, single-stroke, command/response type devices. Simplistic/rugged display components for input echo, visual verification, view of requested data and alarm messages can also be provided. Control stations are located inside the transport shuttles or near the buffer equipment. Input devices should include single function and status indicators.

The Yard Manager module is central to and controls the effective operations of the GRAIL storage yard. It contains a container placement submodule with an algorithm for efficiently placing, storing and retrieving containers within the GRAIL yard. This submodule utilizes storage plan optimization techniques to minimize the number of times a particular container is handled and to minimize movements of container handling equipment during handling of containers.

The Yard Manager module therefore satisfies a basic goal of minimizing the cost and time for container handling. Requests from the other modules are handled by the Yard Manager, which determines the best method to complete the request, queues the tasks, and dispatches the tasks to the appropriate submodules. This module also provides management services to aid in the human decision-making process.

The Yard Manager module must be designed to run fast enough to respond to and service the requests of the Real-Time Control module and several workstations (typically, one at each gate, one in each transport, one each at the garage, customs station, cargo freight station, each buffer, intermodal facility, and the operations control room). This module provides decoding, sequencing and dispatching of requests from the other modules, and provides dynamic planning to assign and route the container handling equipment and containers. It provides management for the Data Base module and an override mode to allow the system operator to remotely control the container handling equipment. In addition, the Yard Manager module provides management services to generate reports, maintain a maintenance schedule, and assist in management decisions.

Data input to this module is in the form of requests from the Input/Output module, the Real-Time Control module and the Data Base module. The Input/Output module inputs commands from the various workstations. The Real-Time Control module returns status information (including emergency requests), and requests assistance in deadlock situations. The Data Base module provides information in response to requests by the Yard Manager.

The Data Base module provides the structure for all short and long term data retention for the GRAIL system. The Data Base module communicates through a Data Base Manager submodule with a data base providing container data, customer information and shipping data. The long term data bases include the container data base, the vessel data base, and the operations data base. The data base module can consist of a number of data base submodules such as a gate input submodule handling input shipping data, a yard proper submodule handling data on inventory and locations of containers, a vessel submodule handling data on containers being loaded to and from the vessel, a gate shipping submodule handling output shipping data, and a management overview submodule handling statistical data of interest to management on the overall performance of the system.

The overall function of the Data Base module is to be an integrated data resource for the yard and a resource of information for management pertaining to the yard. The data base module receives information entered through workstations or from associated computers, collects related data into files, and stores such data for future information retrieval during yard activities, updates data elements in the data collection, and for ease of retrieval of the data, reduces large quantities of data to usable form.

The Real Time Control System module comprises the control aspects of the automated system, and generates control signals for the motion systems using data from the Yard Manager module. Routing optimization, already accounted for in the Yard Manager, is refined in the control strategy. Feedback of the motion systems instantaneous conditions are provided for safety purposes, and collision detection and avoidance are a part of the safety aspects of this module.

The Real Time Control module operates in real time, and includes control of 1 to 5 buffers, a quay area with up to 5 cranes, 20 container carriers (e.g., shuttles, bridge cranes, gantry cranes, etc.), and up to 20 crossroads areas (e.g., switches, traffic intersections). This module accepts commands via the Yard Manager module for assignment of equipment, container manipulation, container carrier routing and status information. This module decodes the Yard Manager commands into commands understandable by its submodules, and synchronizes, monitors and controls the activities in the yard to provide for safe and efficient operations. The module also reports its activities to the Data Base module in order to keep the data base timely and accurate.

Data input to the module is in the form of requests from the Yard Manager and the Data Base system. The Yard Manager issues commands and requests status information. The Data Base module provides information on containers and other yard equipment upon request of the Real Time Control module. Data internal to this module includes the storage of Yard Manager requests, status of all the yard equipment (including position, current assignment, speed, etc.), and traffic control queues such as requests for crossroads areas.

The Real Time Control module communicates with the Yard Manager Data Base and Input/Output Modules. The data output from the Yard Manager is normally status information on the operation of the yard. However, in some circumstances, the Real Time Control module makes requests of the Yard Manager. These requests are in response to either safety-related events in the yard or the results of traffic control problems that the Real Time Control module cannot handle on its own and therefore requests rerouting help.

The GRAIL yard operating computer systems are preferably provided with data on stowage plans for incoming and outgoing vessels by the computer systems of the associated shipping company and data concerning the export containers through the booking files. Inbound stowage plans are transferred from the shipping computer systems to the Yard Manager Module in the GRAIL system before the arrival of the ship. The Yard Manager module produces loading/unloading sequences from combinations of the stowage plan, the yard inventory, and the hatch opening sequence entered by a stowage coordinator.

When the export containers enter the gate, the gate operators acquire the booking information on the containers from the shipping computer system. Pertinent information such as container number, destination, content, container size and type, height, etc. are transferred to the Yard Manager module. The Yard Manager module enumerates stack locations from the information received, and transmits appropriate instructions to the gate operators which can be presented on visual display units.

The GRAIL yard operating system provides yard inventory and stacking information to the shipping company's computer system on an on-line and real time basis to update the shipping company's computer inventory program.

The shipping company computer and the Yard Manager module can communicate in a batch mode or a file dump mode to transfer stowage files. The Real Time Control module (RTC) can continuously interrogate the status of the shuttles, and instructs the shuttles on loading and unloading tasks assigned thereto.

While the shuttles are essentially self sufficient and include onboard safety features, in an automated shuttle, the polling frequency should keep pace with the maximum speed of the shuttle, i.e., if the shuttle's speed is fifty feet per second, then the polling frequency should be less than two seconds. The shuttle is preferably capable of initiating communications with the RTC module, which generally requires fast responses and has priority over regular pollings When the shuttles are operated manually, the communication requirements, including timing, are the same as the checker or the crane operators, except the polling of the address status, and the speed and timing of the communications are not as critical as when the shuttles are automated.

The present invention contemplates several possible levels of automation of the GRAIL yard operating system. With manual operation of the shuttles and manual task assignments, interactive communication with operators does not demand immediate responses. The communication timing is not at the same critical level as in automated shuttle operations. With automated shuttles with manual task assignments, the assignment of tasks may be transmitted by task assigners and the responses to the assignments would be automatic. At this stage, the RTC should update the addresses and status of the shuttles by a sequential polling arrangement, wherein the timing and message length are more critical. With automated shuttles with automatic task assignments, the RTC assigns shuttles from the available pool to the tasks in a priority sequence and keeps track of all shuttles at all times. The RTC also controls traffic, coordinates shuttles, optimizes assignments, and optimizes shuttles routes. Communication timing is very critical in this stage.

The GRAIL system can use very "intelligent" shuttles which can automatically move about the yard without much aid from a central facility, or relatively "dumb" shuttles which depend on a remote intelligence for all operations, or a median combination between the two extremes. The shuttle communications can include links between the shuttle and central control, shuttle and shuttle, and shuttle and buffer. At least six basic types of communication can be used in the GRAIL system, direct contact, inductive transmission, radio link, infrared, high frequency leaky coax, and microwave leaky waveguide. However, a direct contact transmission system or an inductive loop communication system is preferred because of their proven industrial experiences.

In a direct contact system, signals are placed on bus bars that run along the track, and the signals are picked up (and transmitted) via collector arms connected to the shuttle that run on the buses making electrical contact therewith. A similar system can be used by an electric shuttle for the transmission of power. The advantages of a direct contact system are that it is simple, direct, low cost, has low maintenance, provides flexibility as to track layout, has a long and successful history of industrial use, causes minimal interference to other electrical systems, and is similar to the system required for power collection.

With an intelligent shuttle, a single bus can carry all the necessary signals, while a dumb shuttle may require a bus for each type of signal. An intelligent shuttle has an additional advantage in that since it needs to communicate infrequently, the lengths of track that are provided with signal buses can be kept to a minimum. Multiple collector contacts, redundant data communications, and error correction software can be used to improve communications and minimize problems with collector contact bounce with the signal bus, which may otherwise produce lost or noisy data.

A variation of the direct contact system can use the power lines as a signal bus, in which the communication data is carried on the same bus lines as the power. Normally in these systems the signals are FM modulated and then added to the power lines. Decoders on the shuttle extract the FM signals and convert the signals to their original form. This type of system eliminates the need for additional signal buses and while some complexity is added, the system is still fairly simple, low cost and easily maintained. This system has had quite a bit of industrial experience, and although it uses FM transmission, it produces minimal interference. If the communications in the GRAIL system is divided into sections, the power sections would also be divided in order to provide separate communication paths for the sections, which limits the flexibility of the communications system. In a GRAIL system that employs intelligent shuttles that must communicate infrequently, this may be no problem at all. However, with dumb shuttles that depend a great deal on communications, this system may not be feasible.

The inductive transmission system has been perfected in recent years in transit systems and is now considered to be a reliable technique. This system places various induction loop antennae in the GRAIL track and on each shuttle. The transmission of data from the loop in the track to the loop on the shuttle (and vice versa) can be viewed as radio transmission over a very short distance. The track loop only transmits data through the air a few inches to be received by the shuttle antenna loop. In this type of system the track antenna can vary greatly in length, and if, for example, the signal must be picked up by the antenna over the entire length of a one hundred foot section, the track induction loop will run the entire length. If on the other hand, the length of signal availability is short, such as picking up a track positional marker, the induction loop can also be short.

An induction loop communications system should provide good tolerance to weather, is flexible, easy to install and maintain and, while it is more expensive than a direct contact system, is still fairly inexpensive. Neither contact noise nor electrical interference is a problem with inductive loop systems. However, data dropouts are possible due to variations in signal strength along the loop. Also, the bandwidth of an inductive loop system is lower than for a direct system, and the complexity of the design is considerably higher. Typically, separate transmitting and receiving antennas are used for each type of signal.

Radio link communications systems are a well established technology, as evidenced by the Matson Bridgetainer and Transtainer operation in Richmond, Cal. Advantages of such a system include the fact that the need for cabling is eliminated, the system is independent of weather and the installation and maintenance costs are low. A problem with a radio link scheme is that the control cannot be easily oriented to the yard position. The communications must be with individual shuttles which are addressed individually. The effect of this is that the number of control schemes that are feasible are limited by the use of a radio link system. While the system is independent of weather such as snow and ice, it is sensitive to external electrical noise and may itself interfere with other equipment. Contact bounce is not a problem, but RF nulls may exist in the yard where the shuttle would not be able to pick up control transmissions.

The remaining two types of communication systems, leaky coax and leaky waveguide, have not yet proven to be reliable in industrial applications. The systems are similar in basic concept to the inductive loop systems in that the commands are transmitted over a very short distance to the shuttle. In a leaky coax system, a coaxial cable is laid along the track, precision slit is cut in the coax from which the signal "leaks" or radiates a small distance. A pickup antenna on the shuttle recovers the command signal. A leaky waveguide system uses the same general concept except a microwave waveguide is used to carry the signal. An advantage of such systems is that many signal channels can be carried on a single line.

An important aspect of the GRAIL control system is the proper positioning of the shuttle above a container. The GRAIL system can use optical, magnetic, mechanical or electronic sensors and encoders, all of which are feasible for operation in the GRAIL system.

Some basic principles for sensing the position of a shuttle along the rail system are illustrated in FIG. 14, the waveforms of which represent signals that the shuttle control system can receive as it moves along a GRAIL track. The signal sources can take many different embodiments, including switches riding over cams, Hall sensors over magnets, or antenna over induction loops, and the principle is the same regardless of the type of sensor.

A first exemplary waveform is labelled "analog", and in this concept a negative voltage is sensed by the shuttle on the left side (in FIG. 14) of the signal line, and as the shuttle moves more to the right the voltage becomes more positive. By sensing the value of the analog voltage, the shuttle's control system can determine the shuttle's location. On a one thousand foot rail segment, a system using a fourteen bit analog to digital converter would be able to resolve position down to about one third of an inch. In this embodiment, the shuttle data collection system is preferably a direct contact system.

A simple and flexible system is shown labeled as "pulsed", and in this embodiment a pulse is picked up by the shuttle each time it moves a given distance. The shuttle simply counts the pulses and calculates its position. A problem with this embodiment is that pulses might be dropped, and this potential problem can be reduced as follows. A "sawtooth" embodiment is a combination of the pulsed and analog embodiments. Every x feet the voltage moves from $-V$ to $+V$, and the shuttle calculates its position with a resolution of x feet by counting the sawtooth peaks. To resolve its position within the x distance, an analog voltage is detected therein.

A "square wave" embodiment can also eliminate the problem of dropped pulses, and in this embodiment, every time a distance x is traveled, the shuttle sees a signal that has a value of $+V$ or $-V$. Every time the value changes, the shuttle knows it has traveled x feet. Since the signal is present during the entire distance, this system is relatively reliable.

Another alternative reliable system is labelled "binary word" technique, and in this embodiment the position of the rail is coded in binary, which the shuttle detects. The disadvantage of this system is that it requires more than one sensing line.

All of the above embodiments require sensors on the shuttle which read some sort of marker on the stationary structure. A rail independent embodiment could determine position by sensing movement of the shuttle. For example, position can be determined by counting wheel revolutions. However, during acceleration/deceleration, wheel slippage can occur, thereby resulting in positional errors.

While several embodiments and variations of the present invention for a grid rail container transport and storage system are described in detail herein, it should be apparent that the disclosure and teachings of the present invention will suggest many alternative designs to those skilled in the art.

What is claimed is:

1. A grid rail container handling and storage system for operation at a terminal, servicing the loading and unloading of containers, comprising:
   (a) a high density container storage yard having an overhead grid rail system providing access to storage locations in the yard, in which the containers are stacked on top of one another up to four containers high to define a plurality of stacks of containers, said stacks being aligned side by side to form a plurality of rows of containers with a plurality of rails aligned over said rows and extending substantially perpendicular to the lengths of the individual containers, said grid rail system providing a plurality of overhead access rails to different locations in the yard, and a plurality of passive overhead rail switches located at different junctions of the access rails;

(b) a loading and unloading buffer means for the container storage yard, said buffer means having a first loading container handling means and a second unloading container handling means, with said grid rail system providing at least one overhead access rail extending to said loading and unloading buffer means to service either said first or second container handling means with a single container transfer;

(c) a crane means for loading and unloading containers from or to said buffer means to or from a mode of transportation, said crane means obtaining containers to be loaded from said first container handling means, and depositing containers to be unloaded on said second container handling means; and (d) a plurality of shuttle vehicles for movement on said overhead grid rail system to different locations in the container storage yard, with said overhead grid rail system supporting the shuttle vehicles at a height to enable the shuttle vehicles to travel above a stack of four containers, each shuttle vehicle having an overhead container spreader bar mounted therebelow for releasably grasping a container, and a rotatable container hoisting and lowering means coupled to said container spreader bar, such that the shuttle vehicle can grasp, hoist and lower containers and can rotate a container to and from a storage yard position wherein the length of the container is perpendicular to an overhead access rail from or to a position wherein the length of the container is parallel to an overhead access rail for transportation therealong by a shuttle vehicle and each shuttle vehicle further having an active track switching mechanism for selectively switching through said passive overhead rail switches.

2. A grid rail container handling and storage system for operation at a facility servicing the loading and unloading of containers as claimed in claim 1, wherein said loading and unloading facility comprises a marine terminal servicing the loading and unloading of containers on ships.

3. A grid rail container handling and storage system for operation at a facility servicing the loading and unloading of containers as claimed in claim 1, wherein said loading and unloading facility comprises a rail terminal servicing the loading and unloading of containers on rail cars.

4. A grid rail container handling and storage system for operation at a facility servicing the loading and unloading of containers as claimed in claim 1, further comprising a remote container storage yard having an overhead grid rail system providing access to storage locations in the remote container storage yard, in which the containers are stacked on top of one another, and a grid rail system providing a plurality of access rails to different locations in the remote container storage yard, and a plurality of passive overhead rail switches located at different junctions of the access rails, and a remote container storage yard access line extending between said overhead grid rail system of the container storage yard and the overhead grid rail system of the remote container storage yard.

5. A grid rail container handling and storage system for operation at a terminal servicing the loading and unloading of containers as claimed in claim 1, each shuttle vehicle being mounted onto said grid rail system by a set of mounting wheels at each end of the shuttle vehicle, and means for allowing rotation of each set of wheels relative to the shuttle vehicle to enable the shuttle vehicle to traverse turns in the rails of said grid rail system.

6. A grid rail container handling and storage system for operation at a terminal servicing the loading and unloading of containers as claimed in claim 5, each set of mounting wheels including four wheels, with two wheels being positioned on each side of the rail of said grid rail system.

7. A grid rail container handling and storage system for operation at a terminal servicing the loading and unloading of containers as claimed in claim 1, said active track switching mechanism comprising a variable shuttle vehicle driving means for each of first and second sides of the shuttle vehicle, such that an increased driving force exerted by said variable shuttle vehicle driving means on a first side of the shuttle vehicle relative to the driving force exerted by said variable shuttle vehicle driving means on the second side of the shuttle vehicle results in the shuttle vehicle exerting a turning movement toward the second side of the shuttle vehicle.

8. A grid rail container handling and storage system for operation at a terminal servicing the loading and unloading of containers as claimed in claim 1, each shuttle vehicle being mounted onto said grid rail system by a set of wheels at each end of the shuttle vehicle, and said active track switching mechanism includes means for selectively offloading the load of the shuttle vehicle from the wheels at each end of the shuttle vehicle while the offloaded wheels are traversing a passive switch.

9. A grid rail container handling and storage system for operation at a terminal servicing the loading and unloading of containers as claimed in claim 1, said grid rail system including a separate guide track along the rail through passive switches in said grid rail system, and said active switching mechanism on each shuttle vehicle including selectively actuable guide track engaging means, such that the shuttle vehicle selectively engages the guide track through a passive switch along which the shuttle vehicle is to travel through the passive switch.

10. A grid rail container handling and storage system for operation at a terminal servicing the loading and unloading of containers as claimed in claim 1, each shuttle vehicle being mounted on said grid rail system by sets of wheels at each end of the shuttle vehicle, with the wheels being mounted on both sides of the rail, and said active switching mechanism including means for selectively disengaging the mounting wheels on one side of the track while the shuttle vehicle is traversing a passive switch.

11. A grid rail container handling and storage system for operation at a terminal servicing the loading and unloading of containers as claimed in claim 1, said container hoisting and lowering means including a telescoping hydraulic hoist having a plurality of coaxial hydraulic pistons of different diameters mounted one within the other in a hydraulic telescoping arrangement.

12. A grid rail container handling and storage system for operation at a terminal servicing the loading and unloading of containers as claimed in claim 1, said buffer means including two raised container supporting platform surfaces at two different raised heights, and means for selectively laterally shifting containers along each platform surface.

13. A grid rail container handling and storage system for operation at a terminal servicing the loading and unloading of containers as claimed in claim 12, said means for selectively laterally shifting including a plurality of selectively drivable conveyors located along the platform surface.

14. A grid rail container handling and storage system for operation at a terminal servicing the loading and unloading of containers as claimed in claim 1, including a system real time control computer which transmits data and commands to each shuttle vehicle, and each shuttle vehicle including a shuttle computer for controlling operations of the shuttle vehicle and for receiving and transmitting data and commands with said system equipment control computer.

15. A grid rail container handling and storage system for operation at a terminal servicing the loading and unloading of containers as claimed in claim 14, further including a yard manager computer for controlling the efficient placement, storage and retrieval of containers within the high density container storage yard to minimize movements of containers and container handling equipment, said yard manager computer also queueing and dispatching container handling tasks, and also for receiving and transmitting data and commands with said system control computer, said system control computer receiving storage data for a ship and also maintaining therein data on the storage yard inventory, and directing loading and unloading sequences from the storage data and the yard inventory data.

16. A grid rail container handling and storage system for operation at a terminal servicing the loading and unloading of containers as claimed in claim 14, said grid rail system including means for providing positional marker information at locations therealong, and each shuttle vehicle including means for reading the positional marker information, which is transmitted as data to said system equipment control computer.

* * * * *